United States Patent
Moyer et al.

[11] Patent Number: 6,042,073
[45] Date of Patent: Mar. 28, 2000

[54] STABILIZING DEVICE

[76] Inventors: Darwin D. Moyer; Frances M. Moyer, both of 208 E. Main St., P.O. Box 253, Gratz, Pa. 17030

[21] Appl. No.: 09/057,759

[22] Filed: Apr. 9, 1998

[51] Int. Cl.[7] ...................................................... B60S 9/02
[52] U.S. Cl. ................. 248/346.01; 248/352; 248/188.2
[58] Field of Search .............................. 248/352, 346.01, 248/188.2, 346.11, 558, 910, 159; 482/93, 108; 446/69; 280/475, 763.1; 206/514, 372, 373; 220/23.83, 23.86, 23.88, 23.91

[56] References Cited

U.S. PATENT DOCUMENTS

| | | | |
|---|---|---|---|
| 243,362 | 6/1881 | Crandall | 446/69 X |
| D. 309,519 | 7/1990 | Remler | D3/284 |
| 396,321 | 1/1889 | Baird | 248/159 X |
| 2,124,352 | 7/1938 | Patten | 446/69 |
| 2,893,164 | 7/1959 | Martin | 248/188.2 |
| 3,025,948 | 3/1962 | Appelt | 220/23.88 X |
| 3,138,893 | 6/1964 | Rupar | 248/346.11 |
| 4,573,729 | 3/1986 | Cookson | 294/158 |
| 4,895,256 | 1/1990 | Johnston | 206/501 |
| 5,050,869 | 9/1991 | Frate | 482/94 |
| 5,496,240 | 3/1996 | Damm | 482/93 |

*Primary Examiner*—Ramon O. Ramirez
*Assistant Examiner*—Stephen S. Wentsler

[57] ABSTRACT

A new stabilizing device for stabilizing stationary trailers. The inventive device includes a base block having top and bottom ends, and four sides. A handle is coupled to the top end of the base block. A number of nested shells are stacked on the top end of the base block.

17 Claims, 3 Drawing Sheets

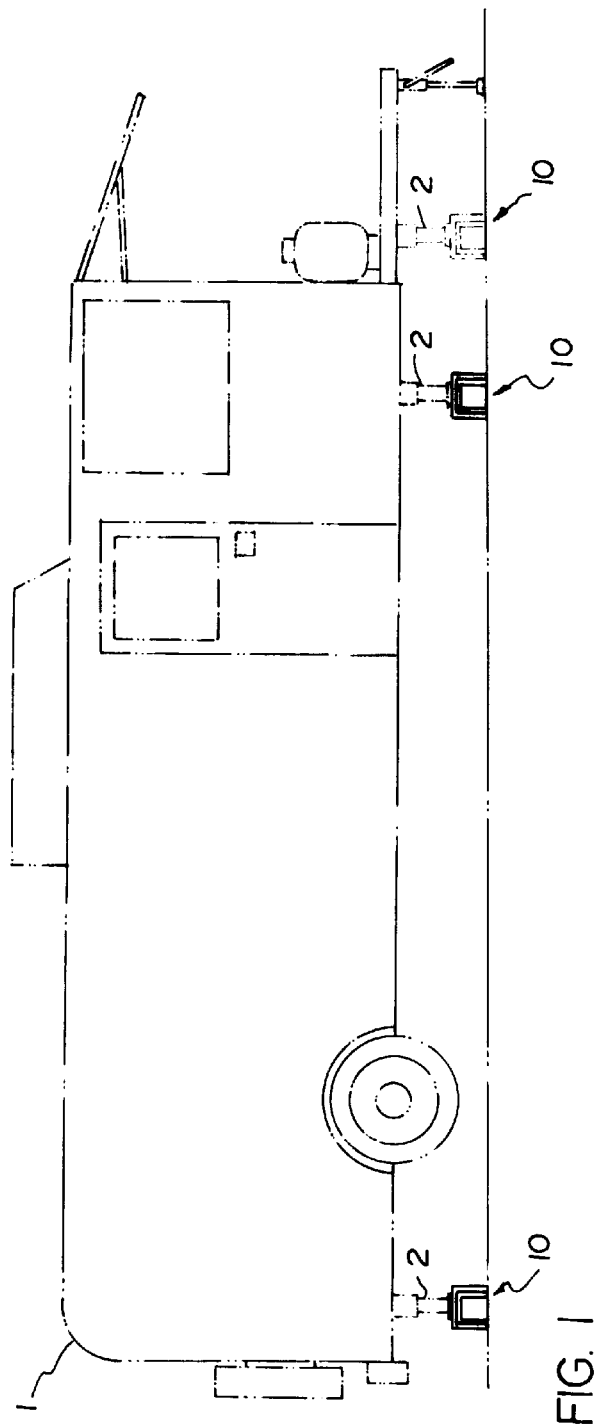
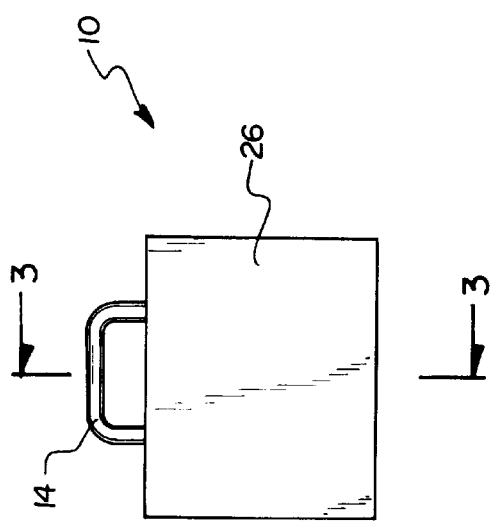
FIG. 1
FIG. 2

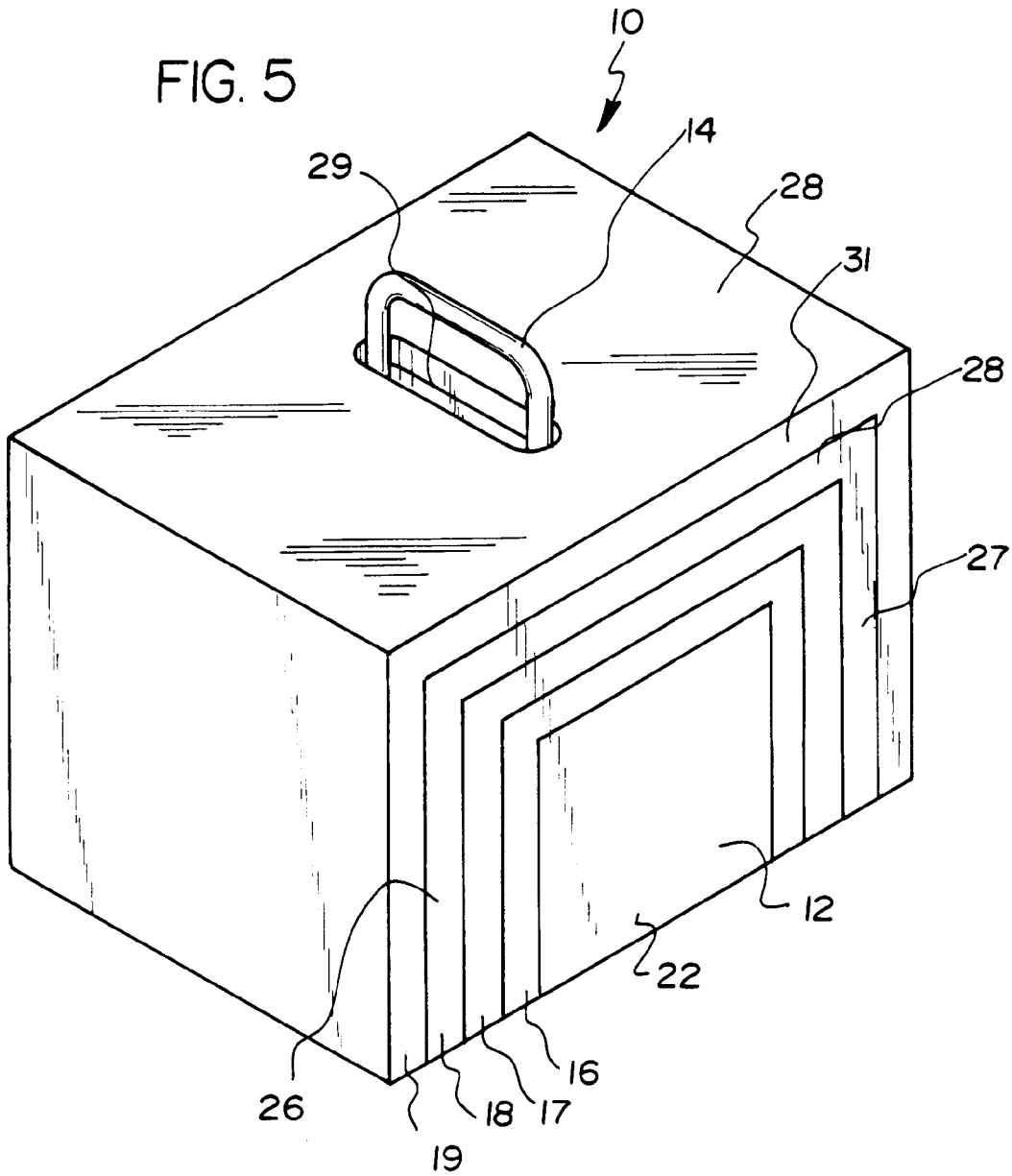

STABILIZING DEVICE

BACKGROUND OF THE INVENTION

1. Field of the Invention

The present invention relates to stabilizing devices for trailers, especially recreational vehicle trailers and more particularly pertains to a new stabilizing device for stabilizing stationary trailers.

2. Description of the Prior Art

The use of stabilizing devices for trailers, especially recreational vehicle trailers is known in the prior art. More specifically, stabilizing devices for trailers, especially recreational vehicle trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art stabilizing devices for trailers, especially recreational vehicle trailers include U.S. Pat. No. 5,121,861; U.S. Pat. No. 1,931,463; U.S. Pat. No. 5,332,066; U.S. Pat. No. 4,540,147; U.S. Pat. No. 1,069,141; PCT Patent No. WO 96/18327 (inventor: Figuereo); and PCT Patent No. WO 83/02492 (inventors: Withers et al.).

While these devices fulfill their respective, particular objectives and requirements, the aforementioned patents do not disclose a new stabilizing device. The inventive device includes a base block having top and bottom ends, and four sides. A handle is coupled to the top end of the base block. A number of nested shells are stacked on the top end of the base block.

In these respects, the stabilizing device according to the present invention substantially departs from the conventional concepts and designs of the prior art, and in so doing provides an apparatus primarily developed for the purpose of stabilizing stationary trailers.

SUMMARY OF THE INVENTION

In view of the foregoing disadvantages inherent in the known types of stabilizing devices for trailers, especially recreational vehicle trailers now present in the prior art, the present invention provides a new stabilizing device construction wherein the same can be utilized for stabilizing stationary trailers.

The general purpose of the present invention, which will be described subsequently in greater detail, is to provide a new stabilizing device apparatus and method which has many of the advantages of the stabilizing devices for trailers, especially recreational vehicle trailers mentioned heretofore and many novel features that result in a new stabilizing device which is not anticipated, rendered obvious, suggested, or even implied by any of the prior art stabilizing devices for trailers, especially recreational vehicle trailers, either alone or in any combination thereof.

To attain this, the present invention generally comprises a base block having top and bottom ends, and four sides. A handle is coupled to the top end of the base block. A number of nested shells are stacked on the top end of the base block.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new stabilizing device apparatus and method which has many of the advantages of the stabilizing devices for trailers, especially recreational vehicle trailers mentioned heretofore and many novel features that result in a new stabilizing device which is not anticipated, rendered obvious, suggested, or even implied by any of the prior art stabilizing devices for trailers, especially recreational vehicle trailers, either alone or in any combination thereof.

It is another object of the present invention to provide a new stabilizing device which may be easily and efficiently manufactured and marketed.

It is a further object of the present invention to provide a new stabilizing device which is of a durable and reliable construction.

An even further object of the present invention is to provide a new stabilizing device which is susceptible of a low cost of manufacture with regard to both materials and labor, and which accordingly is then susceptible of low prices of sale to the consuming public, thereby making such stabilizing device economically available to the buying public.

Still yet another object of the present invention is to provide a new stabilizing device which provides in the apparatuses and methods of the prior art some of the advantages thereof, while simultaneously overcoming some of the disadvantages normally associated therewith.

Still another object of the present invention is to provide a new stabilizing device for stabilizing stationary trailers.

Yet another object of the present invention is to provide a new stabilizing device which includes a base block having top and bottom ends, and four sides. A handle is coupled to the top end of the base block. A number of nested shells are stacked on the top end of the base block.

Still yet another object of the present invention is to provide a new stabilizing device that may be used to prevent the over extension of built-in stabilizers on trailers and vehicles, especially recreational vehicle trailers. In use, this helps keep the trailers more stable. A user may add several stabilizing devices to add to stability of the trailer.

Even still another object of the present invention is to provide a new stabilizing device that are very portable and have a handle for ease of carrying.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description make reference to the annexed drawings wherein:

FIG. 1 is a schematic side view of a new stabilizing device in use according to the present invention.

FIG. 2 is a schematic side view of the present invention.

FIG. 5 is a schematic top front perspective view of the present invention.

DESCRIPTION OF THE PREFERRED EMBODIMENT

Figure 3:
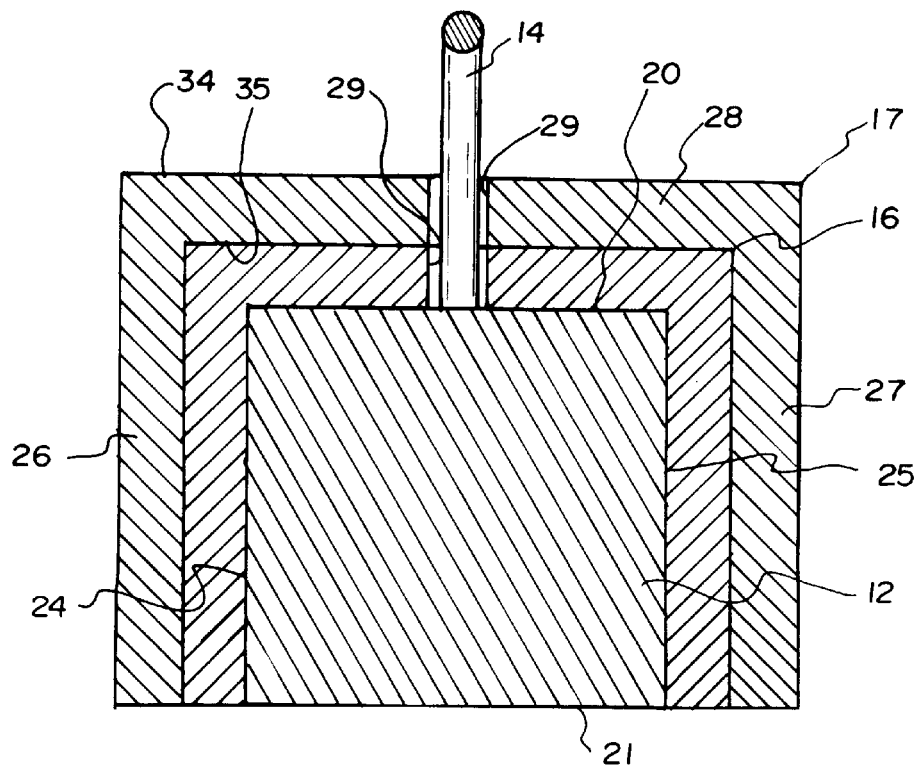
FIG. 3 is a schematic sectional view of the present invention take form line 3—3 of FIG. 2.
Figure 4:
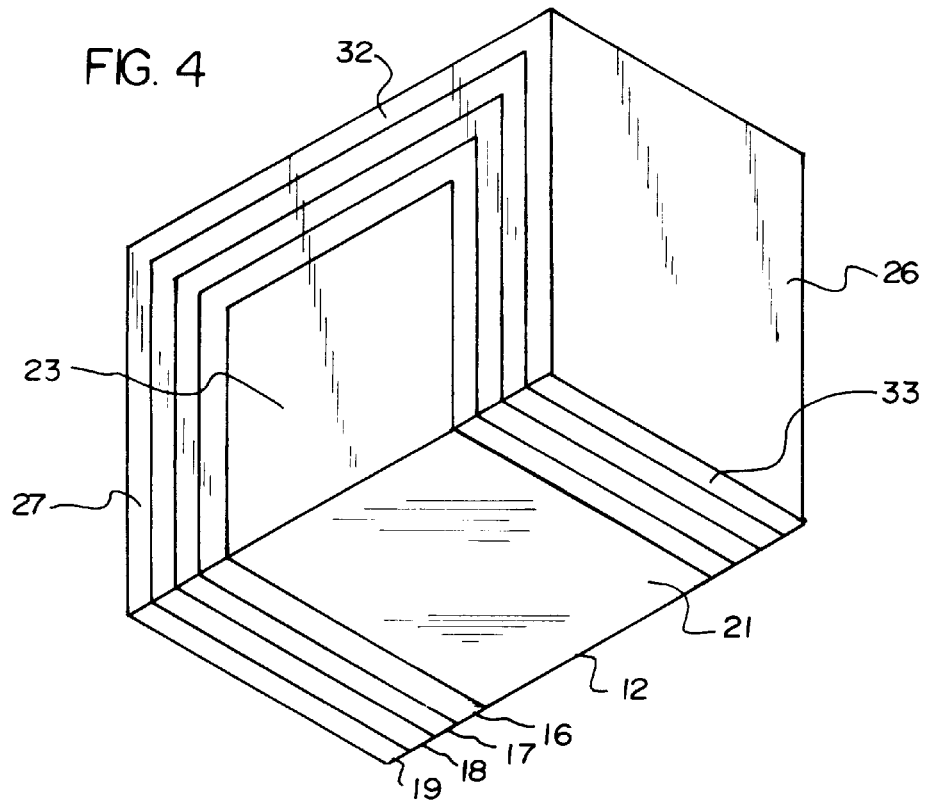
FIG. 4 is a schematic bottom back perspective view of the present invention.

With reference now to the drawings, and in particular to FIGS. 1 through 5 thereof, a new stabilizing device embodying the principles and concepts of the present invention and generally designated by the reference numeral 10 will be described.

In use, the stabilizing device 10 is designed for resting a stationary trailer 1, especially a recreational vehicle trailer, thereon on a ground surface so that the trailer is very stable. In particular the stabilizing device may be used for resting the stabilizing legs 2 and even the fifth wheel hitch of a trailer 1 thereon. As best illustrated in FIGS. 1 through 5, the stabilizing device 10 generally comprises a base block 12 having top and bottom ends 20,21, and four sides. A handle 14 is coupled to the top end 20 of the base block 12. A number of nested shells 16,17,18,19 are stacked on the top end 20 of the base block 12.

In closer detail, the base block 12 is preferably generally cubical. The base block 12 has top and bottom ends 20,21, and four sides 22,23,24,25 extending between the top and bottom ends. Preferably, the four sides of the base block 12 comprise parallel first and second sides 22,23, and parallel third and fourth sides 24,25.

The handle 14 is generally U-shaped and is coupled to the top end 20 of the base block 12. The handle 14 is designed for aiding the carrying of the base block 12 by as user. The handle 14 is preferably centrally positioned on the top end 20 of the base block 12 with the length of the handle 14 is extended substantially parallel to a parallel pair of opposite sides 24,25 of the base block 12.

A number of nested shells 16,17,18,19 are stacked on the top end 20 of the base block 12. The shells 16,17,18,19 is separable from each other as needed. Each of the shells 16,17,18,19 comprises a pair of spaced apart first and second edges 31,32, lateral sides 26,27, and a top side 28 connecting the top end 20 of the lateral sides 26,27 of the shell together. The lateral and top sides 26,27,28 of each of the shells are preferably generally rectangular. The lateral sides 26,27 of the shells 16,17,18,19 are parallel with the third and fourth sides 24,25 of the base block 12 with one of the lateral sides of each of the shells 16,17,18,19 positioned adjacent the third side 24 of the base block 12 and another of the lateral sides of each of the shells 16,17,18,19 positioned adjacent the fourth side 25 of the base block 12. Preferably, the first edge 31 and the second edge 32 of each of the shells 16,17,18,19 are flush with the first side 22 and second side 23 of the block respectively, that is, lying in a common plane with the respective side 22,23 of the base block 12.

The top sides 28 of each of the shells 16,17,18,19 has a generally oblong slot 29 extending therethrough. The slots of the top sides of the shells are longitudinally aligned when the shells are stacked on the top end of the base block. The handle 14 is extended through the slots 29 of the top sides 28 of the shells 16,17,18,19 when the shells 16,17,18,19 are stacked on the top end 20 of the base block 12.

Each of the lateral sides 26,27 of each of the shells 16,17,18,19 has a bottom edge 33. The bottom edges 33 of the lateral sides 26,27 of the shells is flush with the bottom end 21 of the base block 12, so that the bottom edges lie in a common plane with the bottom end 21 of the base block 12 when the shells 16,17,18,19 are rested on the top end 20 of the base block 12.

In use, the top sides 28 of the shells 16,17,18,19 and the top end 20 of the base block 12 is designed for resting a stationary trailer 1 or the stabilizer supports 2 of a trailer thereon as illustrated in FIG. 1.

In an ideal illustrative embodiment, the base block 12 has a height defined between the top and bottom ends 20,21 of the base block 12 of less than about 8 inches. In this embodiment, the base block 12 has a depth defined between the first and second sides 22,23 of the base block 12 of less than about 8 inches and a width defined between the third and fourth sides 24,25 of the base block 12 less than about 8 inches.

Each of the shells 16,17,18,19 has top and bottom surfaces 34,35, which define a thickness between them. In the ideal illustrative embodiment, the thickness of the shells 16,17,18,19 are all equal to each other and about ½ inch. Each shell has a width defined between the lateral sides 26,27 of the shell. Preferably, the width of each shell is greater by 1 inch than the width of the adjacent shell stacked beneath it. Similarly, each of the shells 16,17,18,19 has a height which increases by ½ inch to the shell stacked below it. Each shell also has a depth defined between the first and second edges 31,32 which is preferably substantially equal to the depth of the base block 12.

In use, the shells are stacked on the base block until a desired height is achieved. The base block with stacked shells is placed under a trailer 1 or the supports of a trailer 2 so that the trailer is stabilized when stationary.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A stabilizing device for resting a trailer thereon on a ground surface, said stabilizing device comprising:

a base block having top and bottom ends, and four sides;

a handle being coupled to said top end of said base block; and a number of nested shells being stacked on said top end of said base block;

wherein each of said shells comprises a pair of spaced apart lateral sides, a top connecting said lateral sides of said shell together, and first and second edges, wherein said top sides of each of said shells defines a generally oblong slot extending therethrough, and wherein said handle is extended through said slots of said top sides of said shells; and wherein each of the number of nested shells has a width defined between said lateral sides of said shell and each of the number of nested shells includes a lowermost shell and a plurality of shells stackable above the lower most shell, wherein said width of each shell of said plurality of shells is greater by 1 inch that the width of the adjacent shell stacked therebeneath.

2. The device of claim 1, said handle being centrally positioned on said top end of said base block.

3. The device of claim 1, wherein said four sides of said base block comprise parallel first and second sides, and parallel third and fourth sides, wherein said lateral sides of said shells are parallel with said third and fourth sides of said base block, one of said lateral sides of each of said shells is positioned adjacent said third side of said base block, another of said lateral sides of each of said shells is positioned adjacent said fourth side of said base block.

4. The device of claim 3, wherein said first edge of each of said shells lies in a common plane with said first side of said base block, said second edge of each of said shells lies in a common plane with said second side of said base block.

5. The device of claim 1, wherein said base block has a height defined between said top and bottom ends, wherein said base block has a depth defined between said first and second sides of said base block, wherein said base block has a width defined between said third and fourth sides of said base block, wherein each shell has a depth defined between said first and second edges, and wherein said depth of each of said shells is substantially equal to said depth of said base block.

6. The device of claim 5, wherein said height of said base block is less than about 8 inches, wherein said depth of said base block is less than about 8 inches, and wherein said width of said base block is less than about 8 inches.

7. The device of claim 1, wherein each of said shells has top and bottom surfaces, wherein each shell has a thickness defined between said top and bottom surfaces of the shell, wherein said thickness of said shells are equal to each other.

8. The device of claim 7, wherein said thickness of each of said shells is about ½ inch.

9. A stabilizing device for resting a trailer thereon on a ground surface, said stabilizing device comprising:

a base block being generally cubical and having top and bottom ends, and four sides;

wherein said four sides of said base block comprise parallel first and second sides, and parallel third and fourth sides;

a generally U-shaped handle being coupled to said top end of said base block, said handle being centrally positioned on said top end of said base block, said handle having a length, said length of said handle being extended substantially parallel to a parallel pair of opposite sides of said base block;

a number of nested shells being stacked on said top end of said base block;

each of said shells comprising a pair of spaced apart lateral sides, a top side connecting said lateral sides of said shell together, and first and second edges;

said lateral and top sides of each of said shells being generally rectangular;

said lateral sides of said shells being parallel with said third and fourth sides of said base block, one of said lateral sides of each of said shells being positioned adjacent said third side of said base block, another of said lateral sides of each of said shells being positioned adjacent said fourth side of said base block;

said first edge of each of said shells lying in a common plane with said first side of said base block, said second edge of each of said shells lying in a common plane with said second side of said base block;

said top sides of each of said shells defining a generally oblong slot extending therethrough, said slots of said top sides of said shell being longitudinally aligned, said handle being extended through said slots of said top sides of said shells;

each of said lateral sides of each of said shells having a bottom edge, said bottom edges of said lateral sides of said shells lying in a common plane with said bottom end of said base block;

wherein said base block has a height defined between said top and bottom ends of said base block of less than about 8 inches, wherein said base block has a depth defined between said first and second sides of said base block, wherein said depth of said base block is less than about 8 inches, wherein said base block has a width defined between said third and fourth sides of said base block, wherein said width of said base block is less than about 8 inches;

wherein each of said shells has top and bottom surfaces, wherein each shell has a thickness defined between said top and bottom surfaces of the shell, wherein said thickness of said shells are equal to each other, wherein said thickness of each of said shells is about ½ inch;

wherein each shell has a width defined between said lateral sides of said shell, wherein the number of nested shells includes a lowermost shell and a plurality of shells stackable above the lower most shell, wherein said width of each shell of said plurality of shells is greater by 1 inch than the width of the adjacent shell stacked therebeneath; and wherein each shell has a depth defined between said first and second edges, wherein said depth of each of said shells is substantially equal to said depth of said base block.

10. A stabilizing device for leveling a trailer resting on a ground surface of uneven contour, said stabilizing device comprising:

a base block having top and bottom ends, and four sides; and a handle being coupled to said top end of said base block, said handle being centrally positioned on said top end of said base block;

a number of stackable shells, said number of shells including a lowermost shell and a plurality of upper shells, each of said number of stackable shells comprising a pair of spaced apart lateral sides and a top side connecting said lateral sides of said shell together to form a nesting space between said lateral sides, the lateral edge of each of said number of stackable shells having a bottom edge for resting on the ground surface, wherein said top sides of each of each of said number of shells defines a generally oblong slot extending therethrough, and wherein said handle is extendable through said slots of said top sides of said shells;

wherein the nesting space of said lowermost shell is adapted to completely receive the base block in the nesting space thereof, and wherein the nesting space of each of the plurality of stackable shells is adapted to receive another one of said number of stackable shells in the nesting space of the respective stackable shell in a manner such that the bottom edge of each of the stackable shells maintains contact with the ground surface when said number of shells is placed in a stacked condition on the ground surface.

11. The device of claim 10, wherein each shell has a width defined between said lateral sides of said shell, wherein said width of each shell of said plurality of upper shells is greater by 1 inch than the width of the adjacent shell stacked therebeneath.

12. The device of claim 10, wherein said four sides of said base block comprise parallel first and second sides, and parallel third and fourth sides, wherein said lateral sides of said shells are parallel with said third and fourth sides of said base block, one of said lateral sides of each of said shells is positioned adjacent said third side of said base block, another of said lateral sides of each of said shells is positioned adjacent said fourth side of said base block.

13. The device of claim 12, wherein said first edge of each of said shells lies in a common plane with said first side of said base block, said second edge of each of said shells lies in a common plane with said second side of said base block.

14. The device of claim 10, wherein said base block has a height defined between said top and bottom ends, wherein said base block has a depth defined between said first and second sides of said base block, wherein said base block has a width defined between said third and fourth sides of said base block, wherein each shell has a depth defined between said first and second edges, and wherein said depth of each of said shells is substantially equal to said depth of said base block.

15. The device of claim 14, wherein said height of said base block is less than about 8 inches, wherein said depth of said base block is less than about 8 inches, and wherein said width of said base block is less than about 8 inches.

16. The device of claim 10, wherein each of said shells has top and bottom surfaces, wherein each shell has a thickness defined between said top and bottom surfaces of the shell, wherein said thickness of said shells are equal to each other.

17. The device of claim 16, wherein said thickness of each of said shells is about ½ inch.

* * * * *